United States Patent [19]

Boullain, II et al.

[11] Patent Number: 5,073,258

[45] Date of Patent: Dec. 17, 1991

[54] APPARATUS FOR REMOVING CONTAMINANTS FROM A LIQUID RESERVOIR

[76] Inventors: George E. Boullain, II, P.O. Box 582, Ontario, Calif. 91762; Edward C. Allen, 23993 Eucalyptus Ave., No. 44, Moreno Valley, Calif. 92388

[21] Appl. No.: 514,111

[22] Filed: Apr. 25, 1990

[51] Int. Cl.$^5$ .............................................. B08B 9/08
[52] U.S. Cl. ................................. 210/172; 210/188; 210/247; 210/416.1; 210/258; 210/513; 210/523; 134/147; 134/175; 15/321; 15/345; 15/409
[58] Field of Search ............ 210/172, 247, 188, 416.1, 210/241, 258, 513, 523, 220; 134/147, 175; 15/321, 345, 409

[56] References Cited

U.S. PATENT DOCUMENTS

| | | | |
|---|---|---|---|
| 1,078,512 | 11/1913 | Mills | 15/409 |
| 2,044,088 | 6/1936 | Lord | 417/151 |
| 2,324,422 | 2/1941 | Patterson | 15/409 |
| 2,744,286 | 5/1956 | Carpenter et al. | 15/345 |
| 2,856,205 | 10/1958 | Coleman et al. | 15/409 |
| 3,808,631 | 5/1974 | Shibata et al. | 15/321 |
| 3,977,972 | 8/1976 | Bloch et al. | 210/220 |
| 4,240,173 | 12/1980 | Sherrill | 15/409 |
| 4,374,024 | 2/1983 | Peloguin | 210/241 |
| 4,745,655 | 5/1988 | Johnson | 15/409 |
| 4,801,376 | 1/1989 | Kulitz | 210/123 |

FOREIGN PATENT DOCUMENTS 250221 9/1962 Australia .

Primary Examiner—W. Gary Jones
Assistant Examiner—David Reifsnyder
Attorney, Agent, or Firm—Sheldon & Mak

[57] ABSTRACT

An apparatus and method for skimming contaminants from a reservoir of a liquid such as an industrial solvent, including a tubular wand having an end inlet extending into the reservoir, a pressure air line extending along the wand, the air line protruding a side wall of the wand and terminating at a nozzle proximate the inlet, the nozzle being directed into the wand, away from the inlet for producing a vacuum. The wand is adjustably mounted to a base that attaches to the reservoir, and is connected to a vented container for collecting the contaminants that are drawn into the wand. Contaminants can be removed from the surface of the liquid, from proximate the bottom of the reservoir, or from a submerged layer concentrated at an intermediate depth within the reservoir.

23 Claims, 3 Drawing Sheets

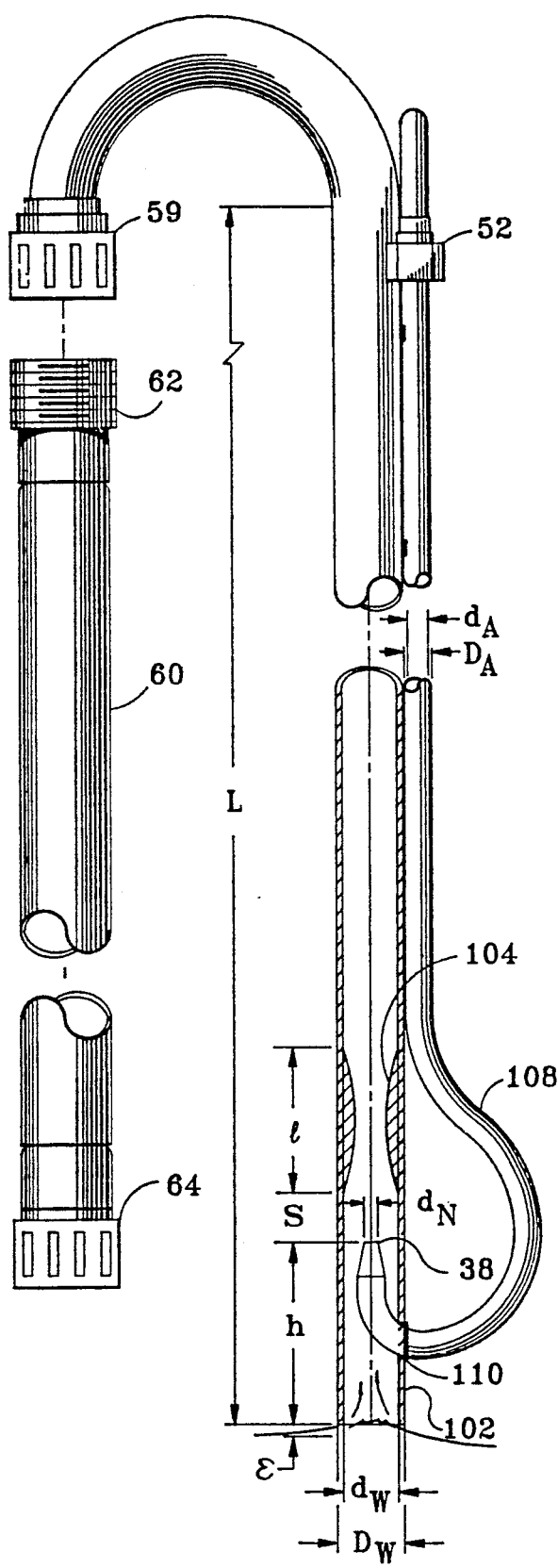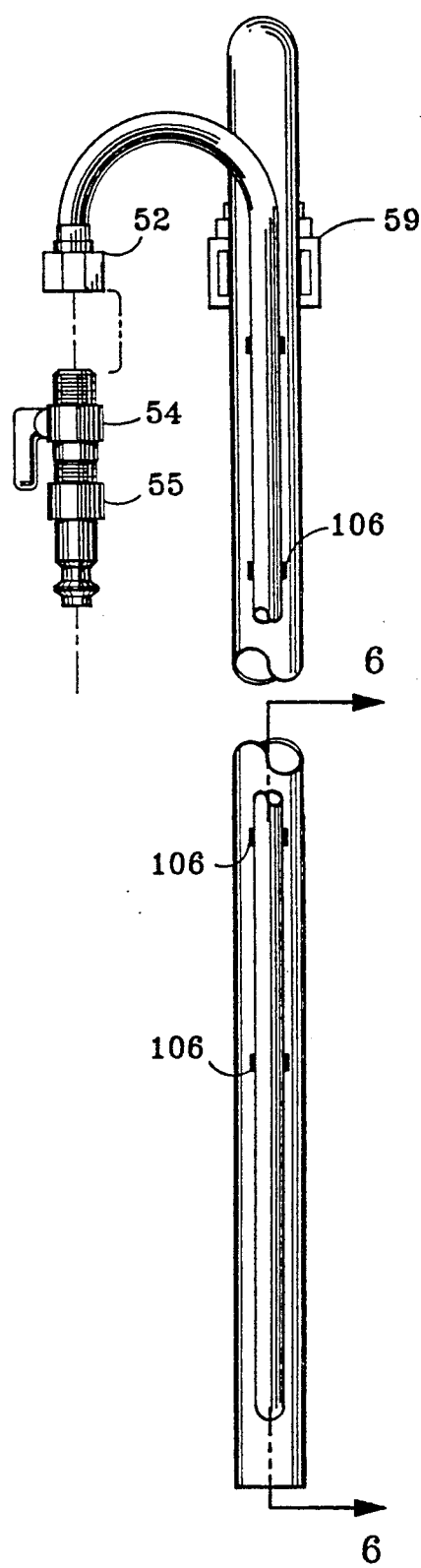
FIG. 6
FIG. 5

APPARATUS FOR REMOVING CONTAMINANTS FROM A LIQUID RESERVOIR

BACKGROUND

The present invention relates to industrial processes, and more particularly to apparatus for removing contaminants such as oils from a liquid reservoir, extending the life of a batch of process liquid such as a solvent.

In many industrial processes, a liquid such as a solvent is circulated from a reservoir to a process location such as a cleaning station, from which the liquid is recovered and transported back to the reservoir and reused. A problem with such processes is that the liquid gradually gets contaminated with foreign material such as oils. When the contamination reaches unacceptable levels, the liquid is discarded, and the reservoir is refilled.

The contaminants typically collect in one or more layers within the reservoir. For example, in many cases, a film of oil contamination accumulates at the top of the liquid in the reservoir. In other cases, a layer of liquid or solids collects at the bottom of the reservoir. It is also possible for contamination to accumulate in a layer at a boundary between different liquid components of the reservoir.

Thus there is a need for a way to extend the life of the process liquid by removing at least a substantial portion of the contaminants from the liquid, that is effective with commonly encountered combinations of liquid and contaminant, and that is easy and inexpensive to provide and use.

SUMMARY

The present invention meets this need by providing a simple apparatus utilizing shop air for controllably vacuuming contaminants from a process liquid reservoir. The apparatus includes a tubular wand having an end inlet, means for mounting the wand with the inlet extending into the reservoir, a nozzle mounted in the wand near the inlet and aimed into the wand, means for connecting the nozzle to a source of pressure air for producing a vacuum at the inlet. The apparatus also includes a vessel for the contaminants, and means for fluid connecting the vessel to the wand, whereby the contaminants are vacuumed from the reservoir and collected in the vessel. The apparatus is particularly simple and inexpensive to provide, in that a source of pressure air, known as "shop air" is typically available in industrial environments, at a pressure on the order of 125 psi.

The support for the wand can be provided by a base, means for fixably mounting the base to the reservoir, and means for fixably locating the wand relative to the base. A locating member can extend downwardly from the base for engaging a side wall of the reservoir, a clamp member also being preferably provided for clamping the locating member against the side wall. A pair of the clamp members can be located for clamping intersecting portions of the side wall. The wand is preferably adjustably mounted to the base by clamped engagement with a trough member that rigidly extends from the base. The trough can have its longitudinal axis oriented normal to a bottom plate surface of the base for vertically orienting the wand. The engagement with the trough member can be against a rigid stem portion of the wand. Thus the inlet can be adjustably located at a desired elevation within the reservoir at which the contaminants are concentrated, for unattended (automatic) removal of the contaminants. For example, contaminants such as oil typically float on many solvents. Thus when the inlet is adjusted to slightly above the liquid level of the reservoir, the floating contaminants can be efficiently vacuumed from the surface of the process liquid. Although some of the liquid might be drawn into the inlet along with the contaminants, the greater density of the process liquid tends to effect a separation of the liquid from the contaminants within the wand, at least some of the process liquid falling from the inlet back into the reservoir subsequent to such separation.

The air can be fed to the nozzle through a J-shaped air line or nozzle tube that rigidly extends along the stem portion and protrudes a side wall of the wand. Also, the nozzle tube preferably extends slightly away from the wand near the point of protrusion of the wand side wall, forming a smooth reverse curve for efficient conduction of the pressure air to the nozzle in a compact arrangement that advantageously permits viewing of the contents of the reservoir in the immediate vicinity of the inlet.

The nozzle can be provided as an end opening of the nozzle tube. Preferably the nozzle forms a necked-down end portion of the nozzle tube for accelerating the pressurized air as it enters the wand. Preferably the nozzle has a nozzle area that is between about 1.5 percent and about 10 percent of an inside cross-sectional stem area of the wand. More preferably, the nozzle area is between about 2.5 percent and about 7 percent of the stem area.

Preferably the wand also is equipped with an annular venturi member within the stem portion and proximate the nozzle for accelerating an upward velocity contaminants entering the wand through the inlet, thereby facilitating transfer of the contaminants out of the reservoir. Preferably the venturi is located such that the nozzle is within a distance of not greater than one inside diameter of the stem portion from the venturi member for cooperative interaction between the nozzle and the venturi member enhancing the upward velocity of the vacuumed contaminants. The venturi member can have a neck area that is from about 25 percent to about 75 percent of the inside stem area. Preferably the neck area is about 55 percent of the inside stem area. The vessel is preferably a closed container for preventing unwanted atmospheric circulation of the liquid and/or solids from the tank, the vessel having inlet means for receiving the contaminants, a vessel outlet for exhausting the gas, and trap means for retaining the contaminants. The trap means can include a filter element from which collected liquid can drip into the container. The trap means can include a baffle member partially blocking a path between the vessel inlet and outlet. The baffle member can have a tubular, slotted portion extending into the container through the inlet, the bottom of the tubular portion being closed for preventing forceful downward flow from the inlet directly into the contents of the vessel. Preferably the slotted openings of the baffle are spaced upwardly from the closed end by at least about half an inside diameter of the slotted portion, the openings each having a height of about the inside diameter or more.

DRAWINGS

These and other features, aspects, and advantages of the present invention will become better understood with reference to the following description, appended claims, and accompanying drawings where:

FIG. 5 is a fragmentary elevational view of a portion of the apparatus of FIG. 1;

FIG. 6 is a side fragmentary elevational view of the apparatus of FIG. 1 on line 6—6 of FIG. 5;

DESCRIPTION

Figure 7:
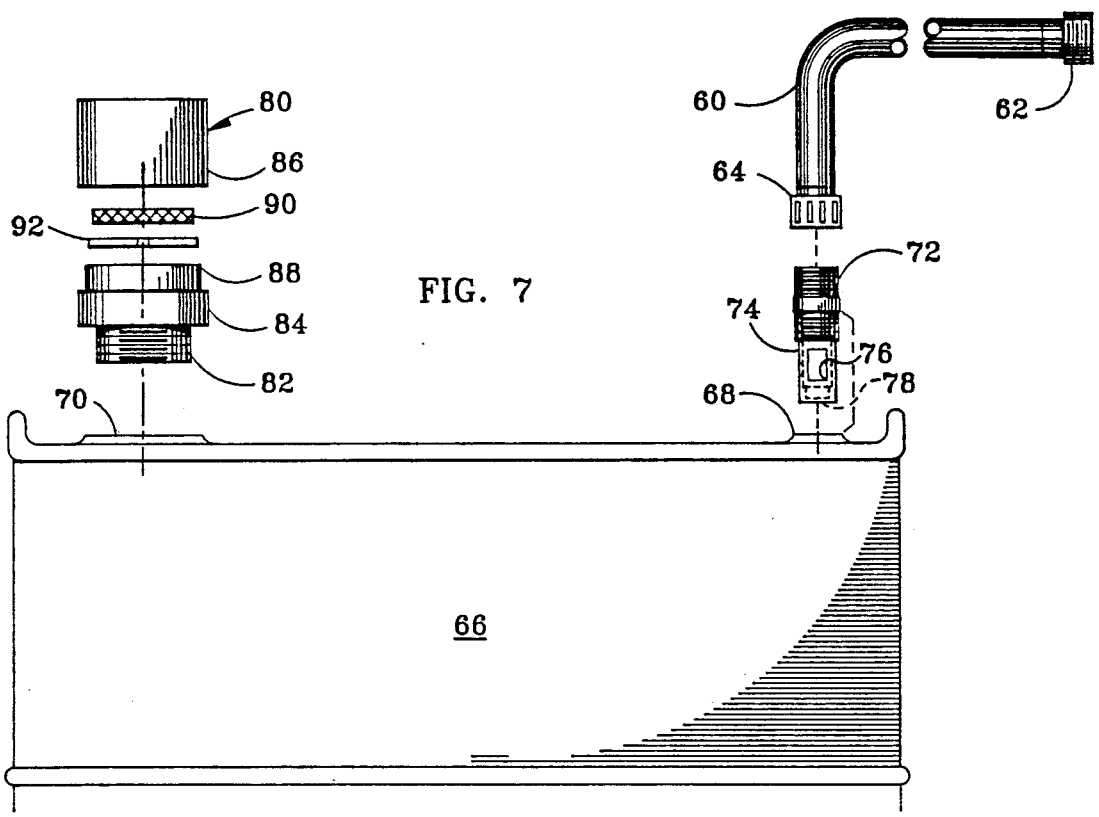
FIG. 7 is a elevational exploded detail view of a portion of the apparatus of FIG. 1.

The present invention is directed to an apparatus for removing contaminants from a reservoir of a liquid such as an industrial solvent, with minimal loss of the solvent. With reference to FIGS. 1-7 of the drawings, a reservoir or tank 10 having a process or other liquid 11 therein is located proximate a source of compressed air, as indicated by the arrow in FIG. 1, the air being fed through an air pipe 12. The tank 10 typically has a pair of upstanding, intersecting side walls 14, upward extremities thereof defining a top surface 15 of the tank 10. The liquid 11 from time to time has a quantity of contaminant therein, the contaminant being concentrated in one or more contaminant layers 16, one such contaminant layer 16 being shown in FIG. 1 as bounded by a top liquid surface 18 of the liquid 11. It will be understood that the contaminate layer 16 may be submerged at any level (including the bottom) within the tank 10.

According to the present invention, a skimming apparatus 20 is operative for removing contaminants that are concentrated in the layer 16, the apparatus having a wand unit 22 for attachment to the tank 10, and a collection unit 24 for receiving contaminants from the wand unit 22. The wand unit 22 has a base assembly 26 and a wand assembly 28, the wand assembly 28 being axially adjustably clamped to the base assembly 26 on a vertical wand axis 30. The wand assembly 28 includes a wand tube 32 having an end inlet 34, the inlet 34 extending into the reservoir for receiving the contaminants, a pressure air line 36 extending along the wand tube 34 in rigid relation thereto, the air line 36 protruding a side wall of the wand tube 32 and terminating at a nozzle opening 38 proximate the inlet 34, the nozzle opening 38 being proximately concentric with the wand axis 30 for directing pressure air upwardly into the wand tube 32, away from the inlet 34 for producing a vacuum whereby material proximate the wand inlet 34 is drawn into the wand tube 32.

The base assembly 26 includes a base member 40 having an upstanding C-shaped member 42 rigidly extending therefrom for receiving the wand assembly 28, the C-shaped member 42 having a freely sliding fit upon the wand tube 32, a wand thumbscrew 44 threadingly engaging the C-shaped member for clamping the wand assembly 28 at a desired elevation relative to the tank 10 as further described below. The base member 40 is adapted for resting horizontally on the top surface 15 of the tank 10, the C-shaped member 42 orienting the wand axis 30 perpendicular to the top surface 15. Also, a corner member 46 extends downwardly from the base member 40 for registering the base member 40 in fixed lateral relation to each of the side walls 14 of the tank 10. Further, the base member 40 is formed with a pair of downwardly extending flange portions 48, a clamp screw 50 threadingly engaging each of the flange portions 48 for rigidly clamping the corner member 46 at the intersection of the side walls 15. Thus the wand assembly 28 can be quickly and accurately positioned proximate both of the walls 15 with the inlet 34 located at a desired elevation relative to the liquid surface 18.

The upward extremity of the air line 36 is curved downwardly, terminating in a wand air fitting 52, an air valve 54 being rigidly connected between the air fitting 52 and a conventional quick-disconnect fitting 55. A flexible air hose 56, having at least one quick-disconnect coupling 58, fluid connects the fitting 55 to the air pipe 12 for controllably generating the flow of pressure air from the nozzle opening 38 in response to operation of the air valve 54. The wand tube 32 is similarly curved at its upward extremity, terminating in a wand outlet fitting 59. A flexible transfer hose 60 fluid connects the wand tube 32 to the collection unit 24, the hose 60 having a first hose fitting 62 for mating with the wand outlet fitting 58, and a second hose fitting 64 for connection to the collection unit 24.

Figure 1:
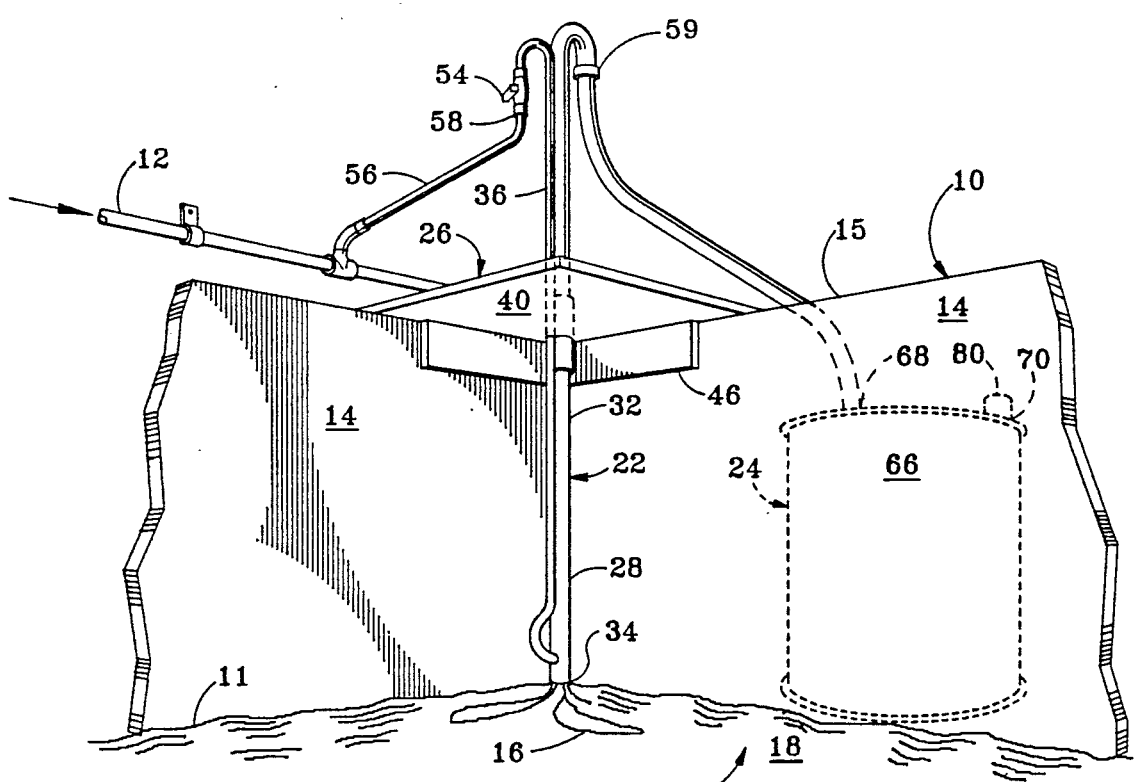
FIG. 1 is an oblique elevational perspective view of apparatus for removing contaminants from a liquid reservoir according to the present invention, the apparatus being shown in operation skimming contaminants from a liquid in the reservoir.

As best shown in FIG. 7, the collection unit 24 includes a closed collection container 66 having a container inlet 68 and a container outlet 70, the container inlet 68 being provided with an inlet coupling 72 that sealingly threadingly engages the inlet 68 for connecting the second hose fitting 64 of the transfer hose 60. The inlet coupling 72 is configured for engaging the smaller bung hole of a conventional 55-gallon drum as shown in FIGS. 1 and 7, the drum advantageously providing a conveniently available large capacity configuration for the collection container 66. The conventional larger bung hole of the drum similarly serves as the container outlet 70. Contaminants from the tank 10, together with pressure air and small amounts of the liquid 11, are carried into the container 66 through the inlet coupling 66. The collection unit 24 is adapted for retaining the contaminants together with whatever quantities of the liquid 11 that are transferred via the transfer hose 60, but not the pressure air. For this purpose, the inlet coupling 72 is provided with a tubular baffle member 74 having a plurality of spaced, vertically oriented slots 76 therein, the baffle member 74 extending into the collection container 66 with the slots 76 opening inside the container 66, the baffle member 74 being closed at its bottom extremity by a plug member 78. Thus the stream entering the container 66 from the transfer hose 60 is blocked by the plug member 76 from forceably splashing into the liquid contents already in the container. Instead, the liquid and/or solid components of the stream are redirected to the side, falling only under the influence of gravity, while the pressure air passes mostly above the liquid, also through the slots 76, for minimal entrainment of the process liquid 11 and/or the contaminants thereof in the pressure air flowing about in the container 66.

In the preferred configuration of the collection unit 24 shown in FIG. 7, the inlet coupling 72 is a 1" threaded pipe coupling, the baffle member 72 having an inside diameter $d_B$ of approximately 0.75 inch. The slots 76 are spaced upwardly from the plug member 78 by a spacing $s_B$ of approximately 0.4 inch (at least about half of the inside diameter $d_B$) for effectively redirecting the stream from the transfer hose 60. Also, there are a pair of the slots 76, each having a vertical length $h_B$ of approximately 4.0 inches and a width $w_B$ of approximately 0.5 inch.

As further shown in FIG. 7, the collection unit 24 is provided with an exhaust filter assembly 80 for preventing escape of the liquid 11, and/or the contaminants thereof, from the container 66. The filter assembly 80 is fluid connected to the container 66 by an exhaust coupling 82 that sealingly threadingly engages the container outlet 70. An upper extremity of the exhaust coupling 82 also sealingly threadingly engages a base ring 84 of the filter assembly 80, the filter assembly 80 also including a vented filter body 86 that is removably sealingly connected to a cylindrical engagement surface 88 of the base ring 84. A disc-shaped filter element 90 is removably retained within the body 86 by a retainer ring 92 such that substantially all of the pressure air entering the container inlet 68 must exit only through the filter element 90. Preferably, substantially all liquid droplets and/or contaminant particles that are carried upwardly through the exhaust coupling 82 are collected by the filter element 90, most of the liquid droplets and at least some of the contaminant particles collecting as larger drops that fall from the filter element 90 and/or the exhaust coupling 82 back into the collection container 66. Accordingly, the collection unit 24 is effective for permitting escape of the pressure air while retaining in the container 66 substantially all of the vacuumed contaminant and at least a significant portion of the process liquid 11 that is carried therewith from the reservoir 10. The exhaust coupling 82 can be a $2\frac{1}{4}"$ threaded pipe coupling.

The couplings 72 and 82, the baffle member 74, and the plug member 78, can each be formed of plastic, stainless steel, or aluminum, depending on the properties of the process liquid 11, and its contaminants. The base ring 84 and the filter body 86 can be formed from a suitable plastic, such as Teflon ®, and the retainer ring 92 can be made from Teflon or stainless steel. The filter element 90 itself can be formed of a mesh material, such as a commercially available fine-mesh filter element material for swamp coolers.

Figure 9:
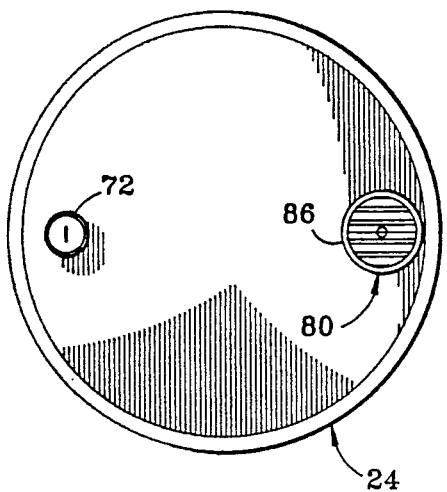
FIG. 9 is a plan view of the apparatus of FIG. 8.
Figure 8:
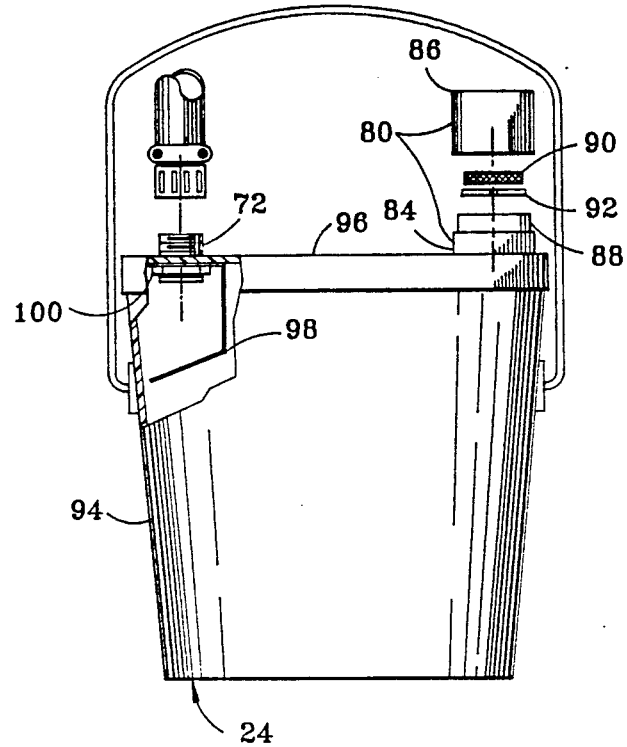
FIG. 8 is a side elevational exploded view showing an alternative configuration of the apparatus of FIG. 7.
Figure 4:
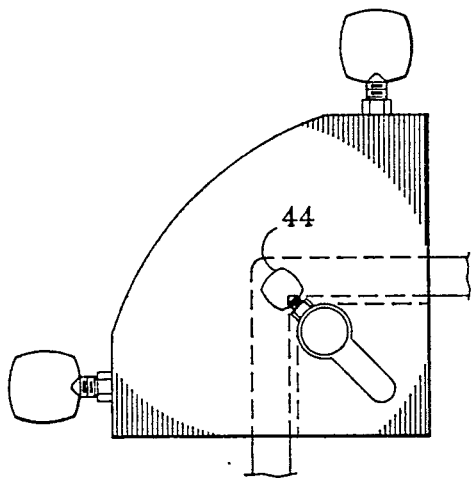
FIG. 4 is a plan view of the apparatus of FIG. 2.
Figure 3:
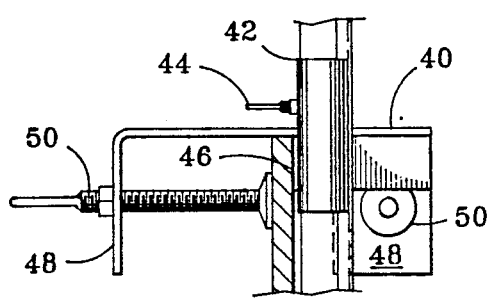
FIG. 3 is a side elevational detail view of the apparatus of FIG. 2.
Figure 2:
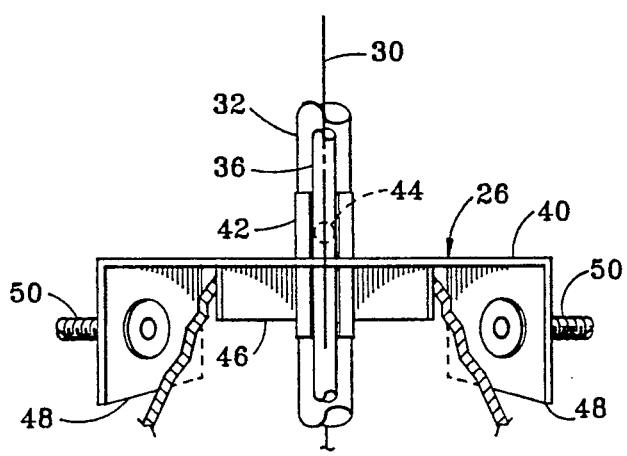
FIG. 2 is an oblique side elevational view of a portion of the apparatus of FIG. 1.

With further reference to FIGS. 8 and 9, an alternate configuration of the collection unit 24 includes a pail 94 having a removable lid 96 sealingly affixed thereto, the combination of the pail 94 and the lid 96 functioning as the collection container 66. Accordingly, the lid 96 is formed with counterparts of the container inlet 68 and the container outlet 70, described above. In the configuration of FIGS. 9 and 10, the inlet coupling 72 is threadingly advanced downwardly into the container inlet 68 such that a portion of the coupling 72 protrudes below the lid 96. A baffle member 98 is mounted within the pail 94 against the lid 96, the baffle member being protruded by the inlet coupling 72 and retained in place by a lock nut 100. As shown in FIG. 9, the baffle member 98 extends downwardly between the container inlet 68 and the outlet 70 for blocking a direct path therebetween within the container 66, the baffle member 98 also extending beneath the container inlet 68 to proximate a side wall 102 of the pail 94 for blocking a path directly below the container inlet 68. Thus the incoming stream from the transfer hose 60 is blocked from directly striking the liquid and/or solid contents of the collection container 66, the liquid and/or solid material being further blocked from directly migrating to the container outlet. A counterpart of the exhaust filter assembly 80 is connected to the container outlet 70 for trapping incoming liquids and solids within the collection container 66 as described above, the base ring 84 being bonded to the lid 96 by a suitable adhesive. When it is desired to empty the pail 94, the filter body 86 can be removed from the base ring 84, providing an unobstructed path for the contents of the pail 94.

As further shown in FIG. 6, the wand assembly 28 in a preferred configuration includes a venturi member 104 within the wand tube 32, the venturi member 104 forming a smooth restriction on the inside of the tube 32, at a location slightly above the nozzle opening 38. Also, the air line 36 is rigidly connected along the wand tube by means of a series of tack or spot welds 106, the lower portion of the air line 36 smoothly curving slightly away from the wand tube 32, the air line 36 also being formed with a reverse curve 108, the reverse curvature smoothly continuing within the wand tube 32 for alignment of the nozzle opening 38 with the wand axis 30. The lower extremity of the air line 36 is sealingly connected to the protruded wall of the wand tube 32 by a seam weld 110. The wand tube 32 and the air line 36 are each preferably formed from stainless steel for immunity to the process liquid 11 and its contaminants. The transfer hose 60, and the hose fittings 62 and 64 are preferably formed of Teflon. The air valve 54 can be made from brass, and the wand air fitting 52 can be made from brass or aluminum, and the quick disconnect fitting 55 can be made from aluminum or steel.

An experimental prototype of the skimming apparatus 20 has been built and tested, the wand assembly 28 being configured without the venturi member 104. The tank 10, was rectangular, having an inside length of approximately $4\frac{1}{2}$ feet, a width of approximately 3 feet, and a depth of approximately $2\frac{1}{2}$ feet, the liquid surface 18 being approximately 1 foot below the top surface 15. In the experimental apparatus 20, the wand tube 32 has an outside diameter $D_W$ of 0.625 inch, an inside diameter $d_W$ of 0.5 inch, being formed with a length L of approximately 20 inches along the wand axis 30 from the end inlet 34 to an upper extremity of a straight portion of the wand tube 32. The air line 36 has an outside diameter $D_A$ of 0.25 inch, an inside diameter $d_A$ of 0.125 inch, the apparatus 20 being tested with the air line 36 fully open, nozzle opening 38 having a nozzle inside diameter $d_N$ of 0.125 inch. It has been discovered that contaminants such as oil, dust, etc. that collect at the liquid surface 18 are most effectively removed from the reservoir 10 when the end inlet 34 of the wand tube 32 is located a distance $\epsilon$ above the surface 18, the distance $\epsilon$ being approximately 0.125 inch. With the apparatus 20 thus configured (without the venturi member 104, the nozzle opening 38 fully open with the nozzle diameter $d_N$ at 0.125 inch), and operating from an air pressure of 125 psi at the air pipe 12 (the air valve 54 being partially open, a flow rate of one gallon total of contaminant together with a small quantity of the process liquid 11 every three minutes was removed from the tank 10. As discussed above, the inlet 34 of the wand tube 32 is preferably located proximate a corner intersection of adjacent intersecting walls of the tank 10. When the inlet 34 is so located, a flow of contaminants toward the inlet 34 is observed upon the liquid surface 18. As the contaminants are drawn into the proximity of the inlet 34, they travel slightly upwardly on a cone-shaped portion of the surface 18 that is induced by the vacuum that is developed in the wand tube 32. A relatively high-velocity flow of air in the restricted annular gap between the wand tube 32 and the surface 18 tends to lift and separate the floating contaminants from the process liquid 11. An unexpectedly highly efficient sorting process was observed to take place under these conditions, such that a very high proportion of the material extracted from the tank is from the floating contaminants, to the extent that they are present in the tank 10. It is believed that at least a portion of the liquid 11 that is lifted from the surface 18 along with the contamination tends to fall back into the tank under the influence of reduced air current velocities that exist proximate the inlet 34 nearer the wand axis 30 from the wand tube 32 itself. It is further believed that this process is enhanced by the presence of turbulence and/or vortex air currents that are produced within the wand tube 32 between the end opening 34 and the nozzle opening 38. This effect is only observed with the end inlet 34 of the wand tube 32 oriented proximately parallel with the liquid surface 18 (the wand axis being vertical), and with the wand tube 32 being held in a fixed orientation and elevation slightly above the liquid surface 18.

In further tests with the necked down configuration of the nozzle opening 38, and with the venturi member 104 in the wand tube 32, it is expected that an increased flow rate will be achieved. The venturi member 104 can have an inside diameter $d_V$ of between approximately 0.25 inch and approximately 0.375 inch, a length l of between approximately 1.0 inch and approximately 1.8 inches, the bottom of the venturi member 104 being spaced above the nozzle opening 38 by a spacing s of from approximately 0.25 inch to approximately 0.75 inch.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A pneumatic skimming apparatus for removing contaminants from a liquid reservoir, comprising:
   (a) a tubular wand member having an end inlet;
   (b) means for supporting the wand member relative to the reservoir with the inlet of the wand member extending downwardly into the reservoir, the means for supporting the wand member comprising:
      (i) a base;
      (ii) mount means for mounting the base in fixed relation to the reservoir, the mount means comprising a horizontally disposed plate surface of the base for resting on an upper extremity of the reservoir and a locating member fixably connected to the base and extending downwardly from the plate surface for engaging a side wall of the reservoir; and
      (iii) locating means on the base for fixably locating the wand member;
   (c) a nozzle mounted within the wand member proximate the inlet thereof, the nozzle being oriented within the wand member in a direction away from the inlet;
   (d) means for connecting the nozzle to a source of pressurized gas whereby a vacuum is produced at the inlet;
   (e) a vessel for receiving the contaminants; and
   (f) means for fluid connecting the wand member to the vessel,
   whereby the contaminants are drawn from the reservoir and transported from the wand member into the vessel.

2. The apparatus of claim 1, wherein the mount means further comprises a movable clamp member for clamping the side wall of the reservoir against the locating member.

3. The apparatus of claim 1, comprising a pair of movable clamp members for clamping the locating member against an intersecting pair of side wall portions of the reservoir.

4. A pneumatic skimming apparatus for removing contaminants from a liquid reservoir, comprising:
   (a) a tubular wand member having an end inlet;
   (b) means for supporting the wand member relative to the reservoir with the inlet of the wand member extending downwardly into the reservoir, the means for supporting the wand member comprising:
      (i) a base;
      (ii) mount means for mounting the base in fixed relation to the reservoir, the mount means comprising a horizontally disposed plate surface of the base for resting on an upper extremity of the reservoir; and
      (iii) locating means on the base for fixably locating the wand member, the locating means comprising a trough member fixably mounted to the base member and having a longitudinal trough axis, and means for clamping the wand member in fixed relation to the trough member;
   (c) a nozzle mounted within the wand member proximate the inlet thereof, the nozzle being oriented within the wand member in a direction away from the inlet;
   (d) means for connecting the nozzle to a source of pressurized gas whereby a vacuum is produced at the inlet;
   (e) a vessel for receiving the contaminants; and
   (f) means for fluid connecting the wand member to the vessel,
   whereby the contaminants are drawn from the reservoir and transported from the wand member into the vessel.

5. The apparatus of claim 4, wherein the trough axis is perpendicular to the plate surface for orienting the wand member vertically.

6. A pneumatic skimming apparatus for removing contaminants from a liquid reservoir, comprising:
   (a) a tubular wand member having an end inlet and an elongate rigid stem portion for extension into the tank, the stem portion terminating at the inlet;
   (b) means for supporting the wand member relative to the reservoir with the inlet of the wand member extending downwardly into the reservoir, the means for supporting the wand member comprising a trough member having a trough axis and means for clamping the stem portion of the wand member to the trough member with the tube axis in parallel relation to the trough axis and adjustably axially positioned relative thereto for positioning the inlet at a desired elevation within the reservoir;

(c) a nozzle mounted within the wand member proximate the inlet thereof, the nozzle being oriented within the wand member in a direction away from the inlet;

(d) means for connecting the nozzle to a source of pressurized gas whereby a vacuum is produced at the inlet;

(e) a vessel for receiving the contaminants; and (f) means for fluid connecting the wand member to the vessel, whereby the contaminants are drawn from the reservoir and transported from the wand member into the vessel.

7. The apparatus of claim 6, wherein means for connecting the nozzle to a source of pressurized gas comprises a J-shaped nozzle tube, the nozzle tube protruding a side wall of the stem portion of the wand member and being rigidly connected thereto substantially along the full length of the stem portion.

8. The apparatus of claim 7, wherein the nozzle tube extends slightly away from the stem portion proximate the protrusion of the side wall by the nozzle tube, the nozzle tube having a smooth reverse curve formed therein.

9. The apparatus of claim 6, wherein the nozzle comprises an end opening of the nozzle tube.

10. The apparatus of claim 9, wherein the nozzle forms a necked down end portion of the nozzle tube.

11. The apparatus of claim 10, wherein the wand member has an internal stem area, the end opening of the nozzle tube having a nozzle area of between approximately 1.5 percent and approximately 10 percent of the stem area.

12. The apparatus of claim 11 wherein the nozzle area is between approximately 2.5 percent and approximately 7 percent of the stem area.

13. The apparatus of claim 6, further comprising an annular venturi member mounted within the wand member proximate the nozzle.

14. The apparatus of claim 13, wherein the stem portion of the wand member has an inside diameter and at least a portion of the venturi member is located in the stem portion at a distance of not greater than the inside diameter above the nozzle.

15. The apparatus of claim 13, wherein the wand member has an internal stem area and the venturi member has a neck area, the neck area being from about 25 percent to about 75 percent of the stem area.

16. The apparatus of claim 15, wherein the neck area is approximately 55 percent of the stem area.

17. The apparatus of claim 6, wherein the vessel is a closed container having a vessel inlet for receiving the contaminants and a vessel outlet for exhausting the air, and trap means for preventing airborne liquid and solid material from escaping the container.

18. The apparatus of claim 17, wherein the trap means comprises a filter element, and means for connecting the filter element whereby substantially all of the exhausting air passes through the filter element, the filter element being located such that liquid collected thereon falls into the container.

19. A pneumatic skimming apparatus for removing contaminants from a liquid reservoir, comprising:

(a) a tubular wand member having an end inlet;

(b) means for supporting the wand member relative to the reservoir with the inlet of the wand member extending downwardly into the reservoir;

(c) a nozzle mounted within the wand member proximate the inlet thereof, the nozzle being oriented within the wand member in a direction away from the inlet;

(d) means for connecting the nozzle to a source of pressurized gas whereby a vacuum is produced at the inlet;

(e) a closed container for receiving the contaminants, the closed container having a vessel inlet for receiving the contaminants and a vessel outlet for exhausting air, and trap means connected to the vessel inlet for preventing airborne liquid and solid material from escaping the container, the trap means comprising a baffle member in the container for preventing direct passage of the air between the vessel inlet and the vessel outlet; and (f) means for fluid connecting the wand member to the vessel, whereby the contaminants are drawn from the reservoir and transported from the wand member into the vessel.

20. The apparatus of claim 19, further comprising a filter element connected to the vessel outlet whereby substantially all of the exhausting air passes through the filter element for collecting entrained liquid therein, at least a portion of the collected liquid falling into the container.

21. A pneumatic skimming apparatus for removing contaminants from a liquid reservoir, comprising:

(a) a tubular wand member having an end inlet;

(b) means for supporting the wand member relative to the reservoir with the inlet of the wand member extending downwardly into the reservoir;

(c) a nozzle mounted within the wand member proximate the inlet thereof, the nozzle being oriented within the wand member in a direction away from the inlet;

(d) means for connecting the nozzle to a source of pressurized gas whereby a vacuum is produced at the inlet;

(e) a closed container for receiving the contaminants, the container having a vessel inlet for receiving the contaminants and a vessel outlet for exhausting air, and trap means for preventing airborne liquid and solid material from escaping the container, the trap means comprising a baffle member for preventing direct passage of the air between the vessel inlet and the vessel outlet, the baffle member including a tubular portion that extends through the vessel inlet into the container and having a baffle inside diameter, the tubular portion being closed at the bottom and having a spaced plurality of radial openings therein; and (f) means for fluid connecting the wand member to the container, whereby the contaminants are drawn from the reservoir and transported from the wand member into the container.

22. The apparatus of claim 21, wherein the openings are vertically elongate, being spaced upwardly from the closed end by a distance of at least approximately half of the baffle inside diameter, and having an opening height of at least approximately the baffle inside diameter.

23. The apparatus of claim 21, further comprising a filter element connected to the vessel outlet whereby substantially all of the exhausting air passes through the filter element for collecting entrained liquid therein, at least a portion of the collected liquid falling into the container.

* * * * *